United States Patent
Burstein (10) Patent No.: US 7,616,463 B2
(45) Date of Patent: Nov. 10, 2009

(54) VOLTAGE REGULATOR WITH COMMON S-PHASE SIGNALS AND PHASE LOCK LOOPS

(75) Inventor: Andy Burstein, Pleasanton, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 281 days.

(21) Appl. No.: 11/541,503

(22) Filed: Sep. 28, 2006

(65) Prior Publication Data

US 2007/0076455 A1    Apr. 5, 2007

Related U.S. Application Data

(60) Provisional application No. 60/723,562, filed on Oct. 3, 2005, provisional application No. 60/722,249, filed on Sep. 30, 2005.

(51) Int. Cl.
    *H02M 7/00* (2006.01)
(52) U.S. Cl. ........................................... 363/72
(58) Field of Classification Search .................. 363/71, 363/72
    See application file for complete search history.

(56) References Cited

U.S. PATENT DOCUMENTS

| | | | | |
|---|---|---|---|---|
| 3,979,662 | A | * | 9/1976 | Klein ........................... 363/71 |
| 5,737,168 | A | * | 4/1998 | Baker ........................... 361/90 |
| 6,819,577 | B1 | * | 11/2004 | Wiktor et al. ................... 363/72 |
| 2004/0066845 | A1 | * | 4/2004 | Leith et al. .................... 375/238 |

* cited by examiner

*Primary Examiner*—Shawn Riley
(74) *Attorney, Agent, or Firm*—Fish & Richardson P.C.

(57) ABSTRACT

A voltage regulator coupled to an unregulated DC input voltage source by an input terminal, and to a load by an output terminal is disclosed. The voltage regulator converts an input voltage at the input terminal to an output voltage at the output terminal. The voltage regulator includes a master controller and one or more slaves, and each slave includes a switching circuit which serves as a power switch for alternately coupling and decoupling the input terminal to an intermediate terminal, and an internal controller which sends a same control signal to each slave. Each internal controller includes a phase-locked loop which offsets the control signal so that each slave is phase-offset relative to the other slaves.

26 Claims, 9 Drawing Sheets

VOLTAGE REGULATOR WITH COMMON S-PHASE SIGNALS AND PHASE LOCK LOOPS

RELATED APPLICATIONS

This application claims the benefit of priority from U.S. Provisional Patent Application No. 60/722,249, entitled "VOLTAGE REGULATOR," filed Sep. 30, 2005, and from U.S. Provisional Patent Application No. 60/723,562, entitled "VOLTAGE REGULATOR," filed Oct. 3, 2005 the disclosure of each of which is incorporated herein by reference in its entirety.

BACKGROUND OF THE INVENTION

The present invention relates generally to voltage regulators, and more particularly to control systems for switching voltage regulators.

Voltage regulators, such as DC to DC converters, are used to provide stable voltage sources for electronic systems, particularly electronic systems that include integrated circuits. Efficient DC to DC converters are particularly needed for battery management in low power devices, such as laptop notebooks and cellular phones, but are also needed for higher power demand products, e.g., desktop computers or servers. Switching voltage regulators (or more simply "switching regulators") are known to be an efficient type of DC to DC converter. A switching regulator generates an output voltage by converting an input DC voltage into a high frequency voltage, and filtering the high frequency voltage to generate the output DC voltage. Typically, the switching regulator includes a switch for alternately coupling and de-coupling an unregulated input DC voltage source, such as a battery, to a load, such as an integrated circuit. An output filter, typically including an inductor and a capacitor, is coupled between the input voltage source and the load to filter the output of the switch and thus provide the output DC voltage. A controller measures an electrical characteristic of the circuit, e.g., the voltage or current passing through the load, and sets the duty cycle of the switch in order to maintain the output DC voltage at a substantially uniform level.

Voltage regulators for microprocessors are subject to ever more stringent performance requirements. One trend is to operate at ever lower voltages, e.g., less than 1 volt, and at higher currents, e.g., 50-150 amps. Another trend is to turn on or off different parts of the microprocessor in each cycle in order to conserve power. This requires that the voltage regulator react very quickly to changes in the load, e.g., several nanoseconds to shift from the minimum to the maximum load, and to have a fast transient response, e.g., to quickly stabilize without significant voltage or current ripple.

Still another trend is to place the voltage regulator close to the microprocessor in order to reduce parasitic capacitance, resistance and/or inductance in the connecting lines and thereby avoid current losses. However, in order to place the voltage regulator close to the microprocessor, the voltage regulator needs to be small and have a convenient form factor.

In addition to these specific trends, high efficiency is generally desirable in order to avoid thermal overload at high loads and to increase battery life in portable systems. Another desirable feature is for the voltage regulator to have a "standby mode" which consumes little power at low loads.

SUMMARY OF THE INVENTION

A voltage regulator coupled to an unregulated DC input voltage source by an input terminal, and to a load by an output terminal is described. The voltage regulator converts an input voltage at the input terminal to an output voltage at the output terminal. The voltage regulator includes a master controller and one or more slaves, and each slave includes a switching circuit which serves as a power switch for alternately coupling and decoupling the input terminal to an intermediate terminal, and an internal controller which sends a same control signal to each slave. Each internal controller includes a phase-locked loop which offsets the control signal so that each slave is phase-offset relative to the other slaves.

In some implementations, the voltage regulator includes an input terminal coupled to an input voltage source and an output terminal coupled to a load. The voltage regulator also includes a master controller which receives a measurement of an output voltage at the output terminal and generates a switching signal having a frequency on a common line, a plurality of slaves, each slave connected to a common line to receive the switching signal, each slave including a switching circuit to intermittently couple the input terminal to an intermediate terminal, phase shift circuitry to receive and phase shift the switching signal, and an internal controller that receives the phase shifted switching signal and is configured to control the switching circuit using the phase shifted switching signal, and a filter between the intermediate terminals and the output terminal to provide a generally DC output voltage at the output terminal.

In another implementations, a slave switching chip for the voltage regulator includes a switching circuit to intermittently couple an input terminal to an intermediate terminal, phase shift circuitry to receive a switching signal and phase shift the switching signal based on a phase offset, and an internal controller that receives the phase shifted switching signal and is configured to control the switching circuit using the phase shifted switching signal.

Advantages of the invention may include the following.

The voltage regulator handles relatively large currents and reacts quickly to changes in the load. The voltage regulator can include multiple slaves which are operated out of phase in order to reduce current ripple.

These and other features and advantages are realized by a method of operating a voltage regulator having an input terminal coupled to an input voltage source and an output terminal coupled to a load including detecting an output voltage at the output terminal, determining a desired total current for a plurality of slaves each of which having an intermediate terminal from the detected output voltage, generating a differential analog signal representative of the desired total current, deriving a desired slave current for each slave based on the differential analog signal, phase shifting the differential analog signal received at each slave such that each slave has a different phase shift relative to other slaves, and controlling a conduction state of each slave based on the phase-shifted differential analog signal to produce the desired slave current.

These and other features and advantages also can be realized by a method of operating a voltage regulator having a plurality of slaves including setting a switching frequency, transmitting the switching frequency to each slave, phase-offsetting the switching frequency at each slave such that a conductive state of each slave is phase-offset relative to other slaves, and controlling the conduction state of each slave based on a corresponding phase-offset switching frequency.

Other objects, features, and advantages of the present invention will become apparent to one skilled in the art from the following detailed description and accompanying drawings illustrating features of this invention by way of example, but not by way of limitation.

DETAILED DESCRIPTION

Figure 9:
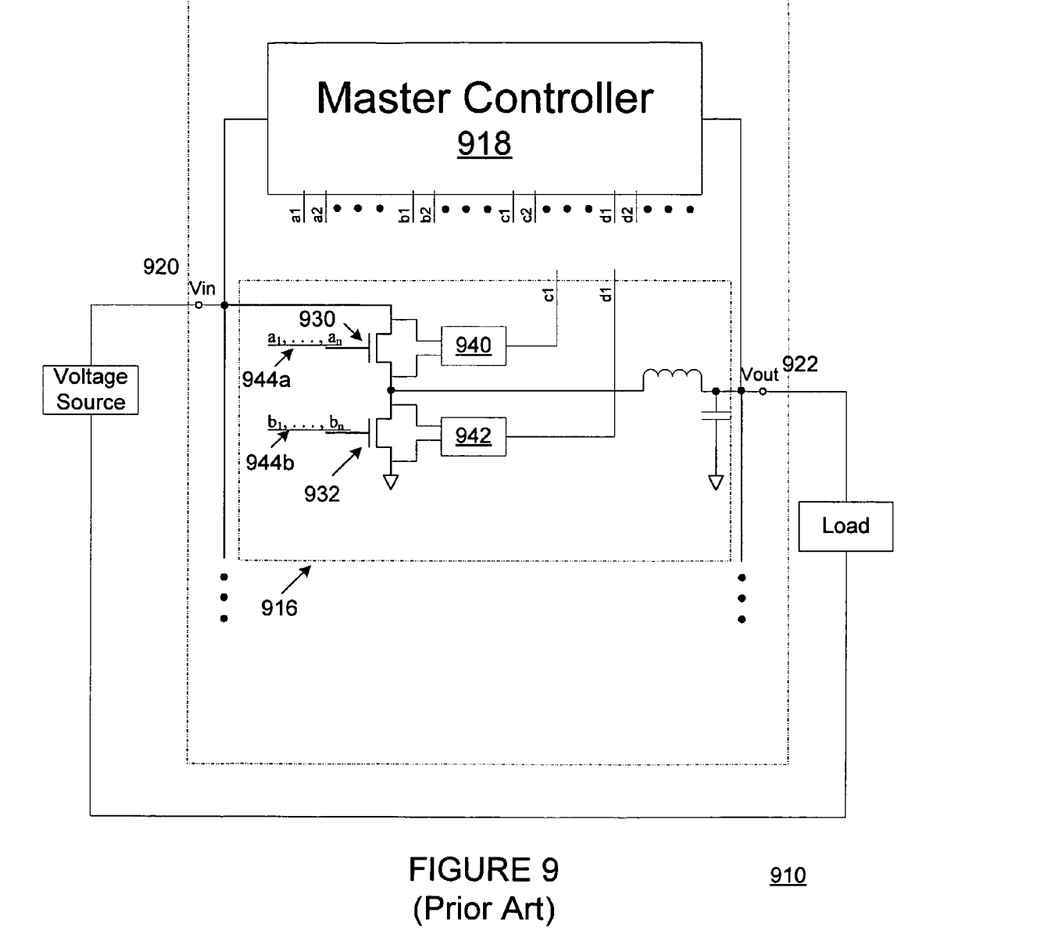
FIG. 9 illustrates a conventional voltage regulator.

FIG. 9 illustrates a prior art voltage regulator 910. Referring to FIG. 9, the switching regulator 910 includes one or more slaves 916 for converting an input voltage $V_{in}$ at the input terminal 920 to an output voltage $V_{out}$ at the output terminal 922, and a master controller 918 for controlling the operation of the slaves 916. Each slave 916 includes current sensors 940 and 942 to measure the current flowing through the transistors 930 and 932, respectively. Each current sensor generates a digital output signal on one or more output lines. The digital output signal on the output line then switches from high to low or from low to high depending on whether the current passing through the slave exceeds or falls below a trigger current. The master controller 918 then incorporates such switching information from the current sensors 940 and 942 in a digital current-based control algorithm. Specifically, based on the output voltage $V_{out}$ and signal feedback received from the slaves and the current sensors, the digital current-based control algorithm controls and sets each slave to an appropriate open/close state so that the output voltage $V_{out}$ is maintained at a substantially constant level. For example, a set of control signals $a_1, a_2, \ldots, a_n$, and $b_1, b_2, \ldots, b_n$ on the timing lines 944a and 944b generated by the master controller 918 controls the open/close state of the transistors 930 and 932 in each slave 916.

As noted above, each slave is individually controlled by its corresponding control signals (e.g., switching signals) provided by the master controller 918. Thus, one drawback associated with the prior art voltage regulator 910 shown in FIG. 9 is that as the number of slaves increases, the number of state control signals and state control lines for driving each slave also increases proportionally. This translates into higher cost and larger size for the master controller 918.

Furthermore, the switching scheme of each slave is governed by the master controller 918, and the received switching signals cannot be locally controlled or adjusted by the slaves. Thus, if the output voltage $V_{out}$ at the output terminal 922 is modified, the master controller 918 needs to alter the entire transistor switching scheme previously assigned to the slaves so as to remain consistent with the modified output voltage. Such task lowers the overall efficiency of the master controller 918, and possibly degrades the performance of the voltage regulator 910.

Figure 1:
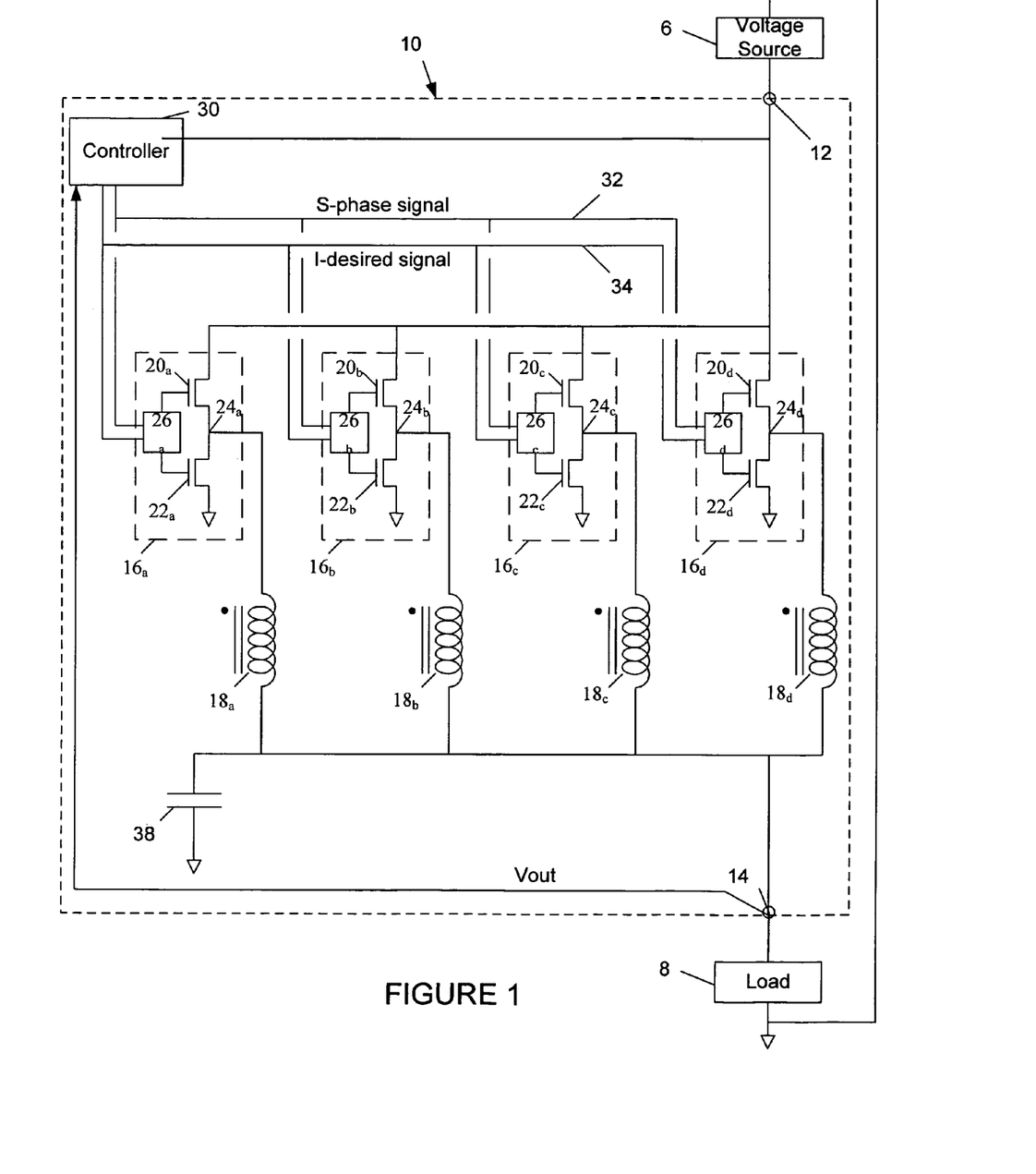
FIG. 1 is a block diagram of an exemplary switching regulator.

Referring to FIG. 1, a switching regulator 10 is illustrated. The switching regulator 10 is coupled to an unregulated DC input voltage source 6, such as a battery, by an input terminal 12. The switching regulator 10 is also coupled to a load 8, such as an integrated circuit or video graphics board, by an output terminal 14. The load 8 typically has an expected target load line voltage $V_{target}$ and a voltage tolerance $\Delta V_{target}$. A typical target voltage $V_{target}$ for a microprocessor chip is in the range of about 0.5 to 1.6 volts, e.g., about 1.0 volts, and a typical voltage tolerance $\Delta V_{target}$ is about +/-1-2% of the target voltage $V_{target}$, e.g., about 15 mV over a load line range of 0.8 to 1.2 volts. The switching regulator 10 serves as a DC-to-DC converter between the input terminal 12 and the output terminal 14. The switching regulator converts an input voltage $V_{in}$ at the input terminal 12 to an output voltage $V_{out}$ at the output terminal 14 which is within the tolerance $\Delta V_{target}$ of the target voltage $V_{target}$. Although the switching regulator will be illustrated and described below for a buck converter topology, the invention is also applicable to other voltage regulator topologies, such as boost converter or buck-boost converter topologies.

The switching regulator 10 includes two or more (N) "slaves" $16_a$, $16_b$, $16_c$ and $16_d$ and an equal number (N) of inductors $18_a$, $18_b$, $18_c$ and $18_d$. Each inductor is coupled to the current output of an associated slave $16_a$, $16_b$, $16_c$ and $16_d$. Although illustrated with four slaves, the switching regulator could have two, six, or another number of slaves. The switching regulator 10 also includes a master controller 30 for controlling the operation of the slaves 16. The master controller 30 may be powered by the voltage source 6 (as illustrated) or by another voltage source.

If the current drawn from the load 8 (or simply "load") increases, then the amount of current passing through the slaves is increased. This permits the current to "ramp up" until the desired load is reached. On the other hand, if the current drawn from the load 8 decreases, the amount of current passing through the active slaves is also decreased. This permits the current to "ramp down" until the desired load is achieved. In general, the master controller 30 can provide command to increase or decrease the current passing through the slaves 16 in response to a change in the output voltage after the load 8 changes. In some implementations, each slave can internally "clamp" or make the necessary adjustment to the current passing therethrough. That is, each slave can be configured to adjust a variable ramp rate if it detects that its output current is too large.

Each slave 16 includes a switching circuit which serves as a power switch for alternately coupling and decoupling the input terminal 12 to an intermediate node $24_a$, $24_b$, $24_c$ and $24_d$. The switching circuit also includes a rectifier, such as a switch or diode, coupling the intermediate node 24 to a low voltage line, e.g., ground. The opening and closing of the switching circuit generates an intermediate voltage $V_{int}$ having a rectangular waveform at the intermediate node 24. In particular, each slave can include a high-side power transistor $20_a$, $20_b$, $20_c$ and $20_d$ having a drain connected to the input terminal 12 and a source connected to an intermediate node 24, and a low-side power transistor $22_a$, $22_b$, $22_c$ and $22_d$ having a source connected to ground and a drain connected to the intermediate node 24. Thus, each slave acts as a switching circuit to alternate between coupling the intermediate node 24 to the input terminal 12 and coupling the intermediate node 24 to ground. In one implementation, both the high-side transistor 20 and the low-side transistor 22 are N-type MOS (NMOS) devices (and the high-side transistor 20 can have a separate gate voltage supply with a ground referenced to the source of the high-side transistor 20). In another implementation, the high-side transistor 20 may be a P-type MOS (PMOS) device whereas the low-side transistor 22 may be an N-type MOS (NMOS) device. In still another implementation, the high-side transistor 20 may be a P-type MOS (PMOS) device whereas the low-side transistor 22 may be an LD-type MOS (LDMOS) device. Moreover, in some implementations, the low-side transistor 22 may be replaced or supplemented by a diode to provide rectification. The two transistors 20 and 22 may be driven by switching signals on control lines 40 and 42, respectively, to create a rectangular voltage waveform at the intermediate node 24.

The intermediate nodes 24 of the slaves are coupled to the output terminal 14 by an output filter. The output filter converts the rectangular waveforms at the intermediate nodes 24 into a substantially DC output voltage at the output terminal 14. The output filter can be considered to include both the inductors 18, and a capacitor 38 that is connected to ground and to the output terminal 14 in parallel. The inductors 18 and capacitor 38 are discrete elements that can be secured to the same board as the chip with the master controller 30 and the chips with the slaves 16.

In any particular slave, when the first transistor 20 is closed and the second transistor 22 is open (the high-side conduction state), the intermediate node 24 is connected to the voltage source 6 and the voltage source 6 supplies energy to the load 8 and the associated inductor 18 through the first transistor 20. On the other hand, if the first transistor 20 is open and the second transistor 22 is closed (the low-side conduction state), the intermediate node 24 is connected to the low voltage line, e.g., ground, and the energy is supplied to the load 8 by the inductor 18.

Each slave 16 can be fabricated on a separate chip. The master controller 30 can be fabricated on a separate chip from the slaves 16, or be located on the same chip as one of the slaves. The master controller 30 and the slaves 16 can be constructed with a combination of analog and digital components.

The master controller 30 sets a switching frequency (S-phase) and a desired total output current (I-desired) on control lines 32 and 34, respectively. The master controller 30 can be connected to voltage sampling circuitry that measures the output voltage $V_{out}$ at the output terminal 14 at one or more discrete times during each cycle of the switching circuit. The sampling circuit may be constructed substantially as described in U.S. Pat. No. 6,020,729, the entire disclosure of which is incorporated herein by reference.

The master controller 30 includes control circuitry, e.g., analog circuitry, which can use the measured output voltage $V_{out}$ to determine a desired total current which will maintain the output voltage $V_{out}$ substantially at the desired target voltage $V_{target}$, e.g., within the voltage tolerance. The desired total current is output as the I-desired signal on a control line 34, e.g., as an analog signal. Optionally, the master controller 30 can also use information from the slaves, e.g., sent over a communication ring 50 as will be described below with respect to FIG. 2, to determine the desired total current.

In some implementations, the target voltage $V_{target}$ can be a function of the load 8, and can include a droop voltage. The target voltage $V_{target}$ can be a linear function of the load 8, e.g. a load line voltage described as $V_{target=Vnom}-I_{load} \times R_{droop}$, where $V_{nom}$ is the nominal voltage at zero current draw, $I_{load}$ is the current flowing into the load, and $R_{droop}$ is a constant representing a droop resistance. In these implementations, to determine the desired total current, the master controller 30 can make a simple differential comparison between $V_{nom}$ and $V_{out}$, and then multiply the difference by a gain factor G1, i.e., $I_{desired}=G1 \times (V_{nom}-V_{out})$. Based on the target voltage $V_{target}$, the switching regulator 10 can adjust each slave to output a desired current that maintains the output voltage $V_{out}$ at substantially the target voltage $V_{target}$. This technique ensures that the slaves adapt to changes with respect to the output voltage $V_{out}$ that may deviate from the target voltage $V_{target}$. In other implementations, the target voltage $V_{target}$ can be a constant value, independent of the load 8. In this later case, the master controller 30 would use a different technique to determine the desired total current.

In some implementations, the slaves receive a differential analog signal (e.g., differential voltage signal) from the master controller 30, and re-interpret the differential analog signal as an average current command. The slaves can be configured to output an average current proportional to the differential analog signal. The slaves can immediately detect if the average current command is high enough that could potentially damage the switching regulator 10, and effectively clamp the average current output so that a constant average current (e.g., an amount of current lower than the average current command) is output.

To determine and output an average current, the slaves can include internal circuitry that receives the differential analog signal, and converts the differential analog signal to a current command signal. For example, the internal circuitry can generate a high current command signal in response to a high differential voltage signal. The incoming differential voltage signal is then monitored on a continuous basis, and if the incoming differential voltage signal is deemed too high, the slaves can clamp the current command signal so as to keep the output current constant. The level to which the current command signal is clamped can be pre-configured as a default value in the slave, or can be communicated to each slave through a communication ring as will be described below with respect to FIG. 2.

In addition, the master controller 30 can include a clock that generates the S-phase signal, which is output on a control line 32. The S-phase signal is typically a square wave, and can have a frequency in the range of 500 kHz to 1500 kHz, e.g., 800 kHz. The S-phase and I-desired signals will be discussed in greater detail below.

Figure 2:
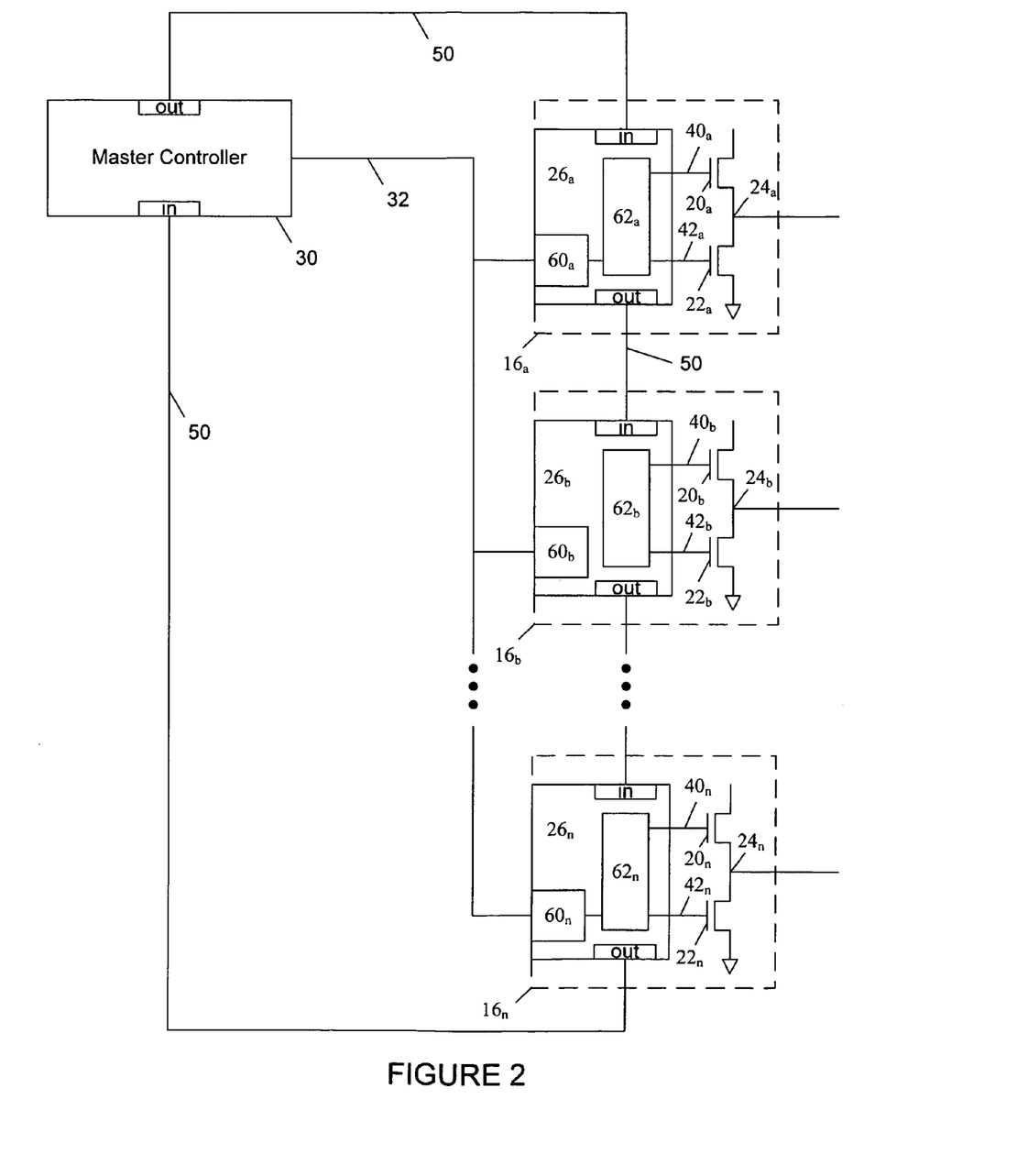
FIG. 2 is a block diagram of an exemplary switching regulator that includes a token ring communication system and a phase locked loop.

Each slave 16 also includes an internal controller 26 which sends control signals on the control lines 40 and 42 as shown in FIG. 2 to the gates of the high-side transistor 20 and low-side transistor 22. Each internal controller 26 receives the same signals from the common control lines 32 and 34 (see FIG. 1) from the master controller 30. In addition, although not illustrated, each slave includes circuitry to measure the output current from the slave that flows into the associated inductor 18, e.g., the current output at intermediate node 24, and to provide this information to the internal controller 26. In some implementations, the internal controller 26 can include an internal circuitry similar to that discussed above for determining and outputting an average current.

Based on the control signals 32, 34 and the measured current, each internal controller 26 determines when to switch between the high-side and low-side transistors in order to achieve, on average, the desired current for the particular slave, as will be discussed in greater detail below. In addition, the internal controller 26 ensures that the high-side transistor 20 and low-side transistor are not conducting simultaneously.

The intermediate node 24 of each slave 16 is electrically connected to one end of an associated inductor 18, whereas the other end of each inductor is electrically coupled and connected to the output terminal 14. In particular, the inductors 18 can be coupled (e.g., wound around a common core), and each winding can be made in the same orientation. The coupled inductors can be designed to have a ratio of magnetizing inductance to leakage inductance (LM/LL) of 7 to 10. In addition, the inductors 18 can have a magnetizing inductance sufficiently low to accommodate a DC current difference of about five amperes between the inductors without saturation (and instantaneous differences can be larger without saturation). Alternatively, the inductors 18 could be uncoupled.

One end of the capacitor 38 is connected to a ground and the end other end of the capacitor 38 is connected to one end of the output terminal 14. The same end of the output terminal 14 is in parallel with the inductors 18. Thus, the combination of the inductors 18 and the capacitor 38 converts the rectangular waveforms of the voltage at the intermediate nodes 24 into a substantially DC output voltage at the output terminal 14.

Referring to FIG. 2, in addition to receiving the control signals on control lines 32, 34, the internal controllers 26 and the master controller 30 can communicate using a ring communication scheme. That is, each controller (including each internal controller 26 and the master controller 30) is connected sequentially in a communication ring 50, and can be configured with a ring communication protocol to pass data bits sequentially from controller to controller (the communication ring could include a single line, such that the ring can only operate serially). The connections between the input and output ports on the slave chips can be hardwired electrical leads on the board.

In brief, the communication ring 50 can operate by passing message frames, with data or commands, from one controller to another. The message frame can include a header identifying the intended recipient controller of the message. For example, a command generated by the master controller 30 can be passed from the master controller 30 to the immediately adjacent internal controller. That internal controller 26 determines whether the message is addressed to it. If it is not the intended recipient, the internal controller 26 passes the message to the next controller. Thus, the message is passed from controller to controller until it reaches the addressed controller. If the internal controller 26 is the intended recipient, the internal controller 26 can act on the message, e.g., by sending a message out from its output port, for example, along the sequence of remaining controllers back to the master controller. In addition, each message is essentially a token that represents which controller is permitted to transmit messages, thus avoiding fighting over control of the communication ring 50. In other implementations, the communication ring 50 could be replaced by a token ring, or by an Ethernet, to permit communication between the controllers.

This ring-communication scheme can be used to pass commands from the master controller 30 to the internal controllers 26 and to pass information from the internal controllers 26 back to the master controller 30. Unlike the S-phase and I-desired signal, which are used for immediate control of the response of the power transistors, these commands and information are of lower priority tasks, e.g., configuring the slaves, that do not require action at the S-phase frequency. For example, switching events triggered by the S-phase signal can be separated by about 1.25 microseconds (assuming that the S-phase signal has a frequency of 800 kHz). In contrast, the messages passed through the communication ring may have an expected response time several hundred to thousand times slower, e.g., on the order of 300 microseconds to 1 millisecond.

Figure 3:
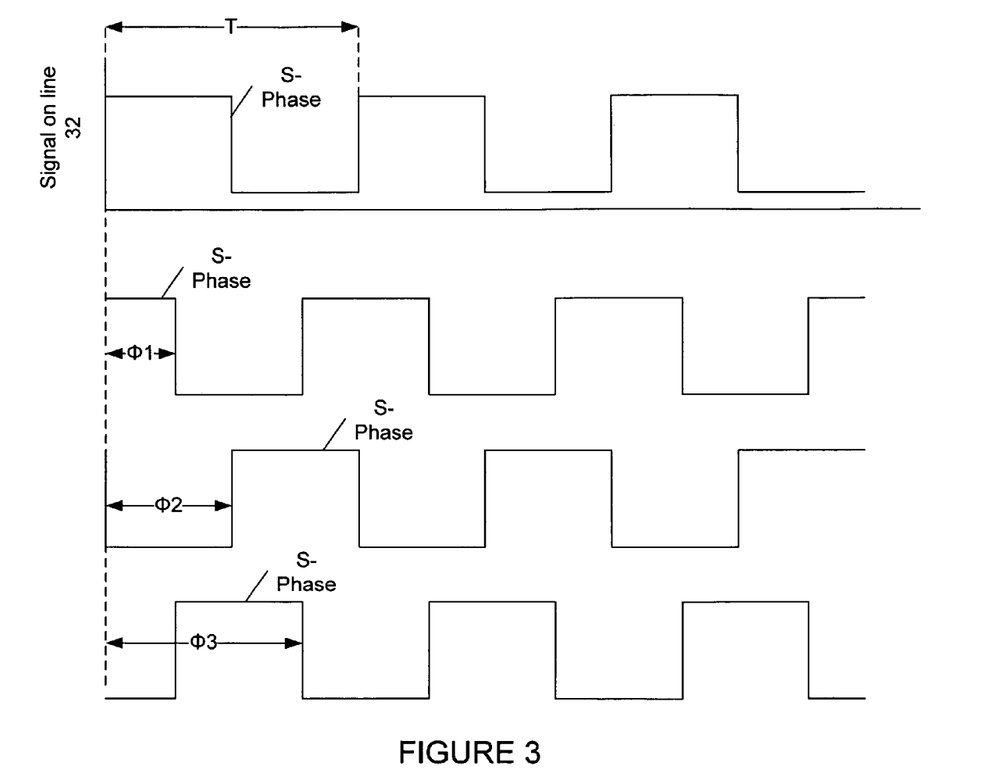
FIG. 3 is a timing diagram showing exemplary phase shifted switching clock signals.

Each internal controller 26 includes a phase-locked loop 60 which offsets the S-phase signal on line 32 so that each slave is phase-offset relative to the other slaves. The phase-offset S-phase signal is input to the control circuitry 62 in the internal controller 26 so that the phase onset of the high-side conduction phase of each slave is phase offset from the other slaves. For example, if two slaves are active, then they should be 180° out of phase, and the time delay should be equal to one-half of the switching period T, i.e., $\Phi(1)=\frac{1}{2}$ T, of the S-phase signal. As shown in FIG. 3, if four slaves are active, then they should be 90° out of phase, and the time delays $\Phi(1)$, $\Phi(2)$, $\Phi(3)$ should be equal to one-third and two-thirds of the switching period, respectively. More generally, for N slaves, the time delay should be 0, 1/N . . . , (N−1)/N of the switching period T. However, under some coupled inductor configurations, the phase shift may not be (N−1)/N of the switching period. In general, by operating the slaves out of phase, the current ripples from each slave will at least partially cancel, thereby providing a more constant output current from the switching regulator.

The phase-offset for the phase-locked loop 60 can be set during a start-up configuration. In particular, during start-up configuration for the voltage regulator 10, the master controller 30 sends a command on the communication ring 50 that counts the number of slaves and causes each slave to determine what particular phase offset should be used for that slave. For example, the master controller can generate a start-up configuration message that includes a counter. After receiving the message, the slave 16 increments the counter, records the number of the counter in an internal register, and passes the message to a next slave 16. When the last slave passes the message back to the master controller 30, the counter is equal to the number of slaves, and each slave has a unique identification in its register. Then the master controller generates a second message on the communication ring 50 that sends the value of the total number of slaves to each internal controller 26.

Since each internal controller then has a unique identifier and knows the total number of slaves, it can determine the appropriate phase offset for itself, e.g., by accessing a look-up table, e.g., as stored in a custom digital circuit or in the memory of a controller. For example, the internal controller can simply calculate a phase offset $\Phi(i)$ representing the time delay in phase lock loop 60 using the following table:

TABLE 1

| Desired phase offset | Total number of active slaves | | | | |
| --- | --- | --- | --- | --- | --- |
|  | 1 | 2 | 3 | 4 | 5 |
| $\Phi(0)$ [reference] | 0 | 0 | 0 | 0 | 0 |
| $\Phi(1)$ |  | ½ T | ⅔ T | ½ T | ⅖ T |
| $\Phi(2)$ |  |  | ⅓ T | ¼ T | ⅕ T |
| $\Phi(3)$ |  |  |  | ¾ T | ⅘ T |
| $\Phi(4)$ |  |  |  |  | ⅖ T |

In general, as shown in the Table, the system can allocate switching slots so that as few spatially adjacent slaves (e.g., based on positions of the inductors on the core) as possible have adjacent switching events. For example, the sum of phase differences between spatially adjacent slaves can be maximized.

It is also possible for there to be more complex arrangement of the inductors, which can result in a more complex phase offset determination. For example, it is possible for the switching regulator to include two or more inductor banks, with each bank of inductors wound around its own core. For example, a switching regulator can include six inductors, with a first bank of three inductors coupled to each other (e.g., wound around a first core), a second bank of three inductors coupled to each other (e.g., wound around a separate second core), but the first group not coupled to the second group. In general, if the banks include an equal number of inductors, then the slaves can be offset by 0, 1/N ..., (N−1)/N of the switching period T, where N is the total number of slaves. For example, in the example with two banks of three inductors, the first bank could have phase offsets of 0, 120° and 240° and the second bank could have phase offsets of 60°, 180° and 300°.

It is also possible for the two banks to have different numbers of inductors. In this case, the proper phase offset can depend on whether the goal is to minimize slave current ripple or to minimize aggregate output current ripple. In general, if the goal is to minimize aggregate output current ripple, the slaves are switched as if uncoupled, e.g., the slaves are phase offset by 0, 1/N ..., (N−1)/N of the switching period T, where N is the total number of slaves.

On the other hand, if the goal is to minimize slave current ripple, the slaves within a given bank are phase offset by 0, 1/M ..., (M−1)/M of the switching period T, where M is the number of slaves in the given bank. In addition, the first slave in one bank can be phase offset from the first slave in the second bank. For example, for a switching regulator that includes a first bank of five inductors and a second bank of four inductors, the inductors of the first bank can switch at 0, 72°, 144°, 216° and 288°, and the second bank of inductors can switch at 45°, 135°, 215° and 285°. The exact phase differences will depend on the granularity of the phase locked loop 60. Alternatively, one or more of the particular slaves can be phase offset to avoid switching at the same time as another slave.

Figure 4:
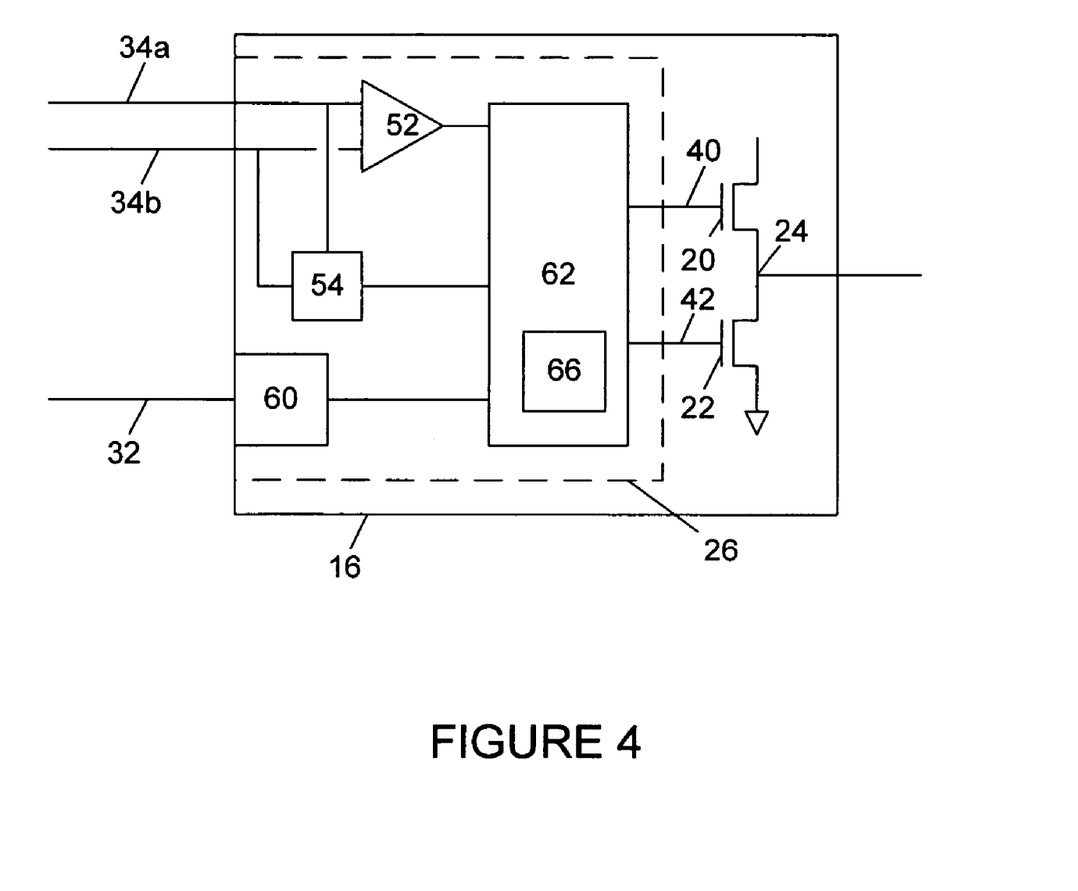
FIG. 4 is a block diagram of an exemplary slave that receives a desired total current output control signal that is differential analog signal.

Although illustrated as a single line 34 in FIG. 1, the I-desired signal can be a differential analog signal as shown in FIG. 4. In particular, the master controller 30 can output a first analog voltage signal $V_{I\text{-desired-high}}$ on line 34a, and a second analog voltage signal $V_{I\text{-desired-low}}$ on line 34b.

The internal controller 26 can include a differential amplifier 52 to generate a voltage difference $$V_{I\text{-desired}} = V_{I\text{-desired-high}} - V_{I\text{-desired-low}}$$

and an averaging node 54 to calculate the common mode voltage $$V_{common\,mode} = (V_{I\text{-desired-high}} + V_{I\text{-desired-low}})/2$$

Figure 5:
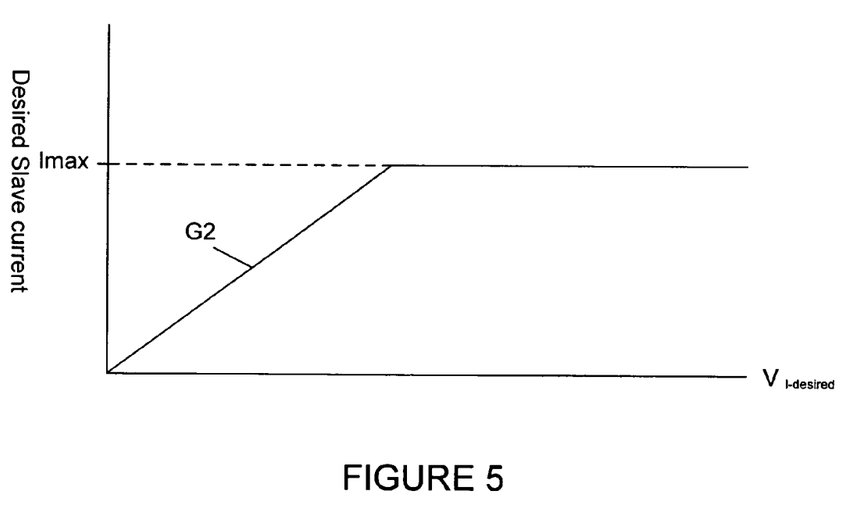
FIG. 5 is a graph illustrating determination of an exemplary desired current for a slave from a desired total current output control signal.

Referring to FIG. 5, the differential amplifier 52 (or other elements in circuitry 62) is configured to output a voltage that represents the desired current $I_{des}(i)$ for the particular slave. The desired slave current $I_{des}(i)$ represents a value proportional to the desired total current, e.g., 1/N (where N is the number of slaves) of I-desired, but is capped at a maximum current $I_{max}$ (represented by a maximum voltage). Capping the desired slave current provides over-current protection to prevent the voltage regulator from attempting to output an amount of current that could damage the circuit. Both the gain G2 and the maximum current value $I_{max}$ can be programmable. $I_{max}$ and G2 can be set by commands passed from the master controller 30 through the communication ring 50.

As noted above, the internal controllers 26 receive the S-phase signal on control line 32 and I-desired signal on control line 34, and independently determine whether to switch between the high-side and low-side conduction phases. However, the common mode voltage can also be used to override the internal controllers 26. If the common mode voltage $V_{common\,mode}$ falls within a preset range (e.g., between a first threshold and a second higher threshold), the internal controller 26 operates normally, and determines locally whether to switch between the high-side and low-side conduction phases. However, if the common mode voltage $V_{common\,mode}$ is outside the preset range (e.g., either below the first threshold or above the second threshold), switching is disabled and the slave is forced to the low-side conduction phase (or alternatively to a floating state or high impedance state in which both transistors are open). This is useful if a sudden shut-down of the slave is needed.

Figure 6:
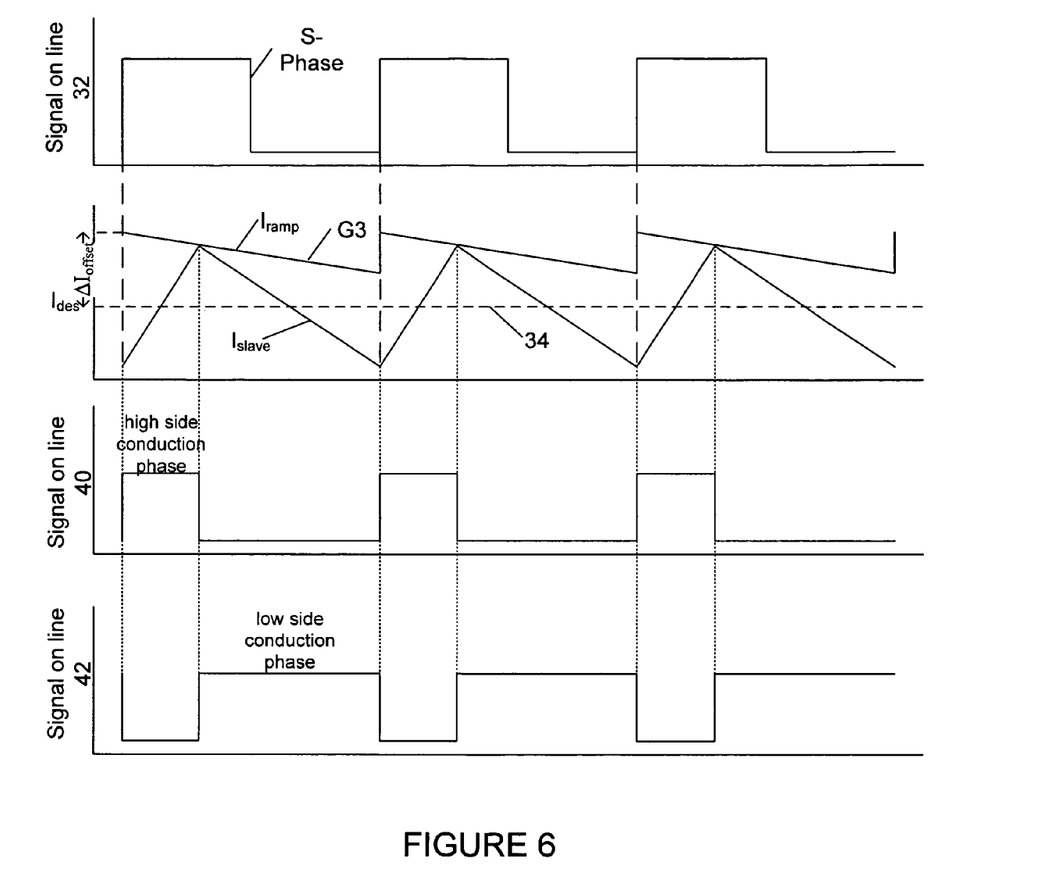
FIG. 6 is a timing diagram illustrating an exemplary switching clock signal, a ramping function, a current passing through a slave, and conduction periods of the high-side and low-side power transistors of a slave.

Referring to FIG. 6, at a given slave, the internal controller 26 triggers the high-side conduction period based on the calculated phase shift from the leading edge of the S-phase signal 32. Thus, barring period-skipping events, the switching circuit has a frequency equal to the S-phase signal, and a given slave switches to the high-side conduction period at each leading edge of the S-phase signal (as phase shifted for the particular slave).

The internal controller 26 triggers the low-side conduction period based on a comparison of an output current from the slave $I_{slave}$ to a ramping function $I_{ramp}$. Specifically, if the output current $I_{slave}$ equals or exceeds the ramping function $I_{ramp}$, the slave switches to the low-side conduction phase. The measurement of the output current can be provided by a current mirror that mirrors the current flowing from the intermediate node 24 to the inductor 18.

The slope of the ramping function $I_{ramp}$ can affect the slave's output response to changes in the average current commands. Those skilled in the art will understand that the relationship between the value of the slope of the ramping function, the output voltage and the values of the inductors interact to provide different dynamics.

In another implementations, the internal controllers 26 can generate an estimated or ghost current that represents the actual slave current, and the estimated current can be compared to the ramping function. The estimated current can be calculated by increasing the estimated current $I_{estimate}$ by a ramp-up value $\Delta I_{up}$ at each clock cycle during the high-side conduction state, and decreasing the estimated current $I_{estimate}$ by a ramp-down value $\Delta I_{down}$ at each clock cycle during the low-side conduction state. Ramp-up and ramp-down values are discussed in U.S. Pat. No. 6,268,716, the entire disclosure of which is incorporated by reference in its entirety. The estimated current can be periodically compared to the actual slave current to adjust the estimate.

The ramp function $I_{ramp}$ can be generated by analog components or be digitally synthesized. Each slave can include an internal circuitry (e.g., internal controller 26) to provide the values of the ramp function $I_{ramp}$. In these implementations, the slave can provide multiple values for the slope of the ramp function $I_{ramp}$ so as to accommodate various switching regulators designed for different applications. Each slave can employ a different ramp function, and the communication ring 50 can be used to inform each slave a suitable slope for a corresponding ramp function selected for that particular slave.

At the start of each high-side conduction period (e.g., as triggered by the leading edge of the phase-shifted S-signal from the phase lock loop 60), the ramp function $I_{ramp}$ is set to a value equal to the desired current $I_{des}$ plus an offset $\Delta I_{offset}$. The ramp function then decreases with a slope G3. The value for G3 can be set digitally and can be passed from the master controller 18 to the internal controllers 26 using the communication ring 50.

If the desired total current $I_{desired}$ increases, the desired slave current $I_{des}$ also increases, thus raising the ramp function $I_{ramp}$. As a result, the high-phase conduction period will last longer (at least during that cycle), and the current will ramp up for a longer time (at least during that cycle), and average slave current will increase. Conversely, if the desired total current $I_{desired}$ decreases, the desired slave current $I_{des}$ also decreases, thus lowering the ramp function $I_{ramp}$. As a result, the high-phase conduction period will be shorter (at least during that cycle), the current will ramp down for a longer time (at least during that cycle), and the average slave current will decrease.

The internal controller 26 can include a combination of analog and digital components. For example, the internal controller can include analog components that generate the ramp function and compare the measured output current to the ramp function to determine whether to switch the transistors to the low-side conduction state. However, various control voltages for the analog components can be set by digital components.

Figure 7:
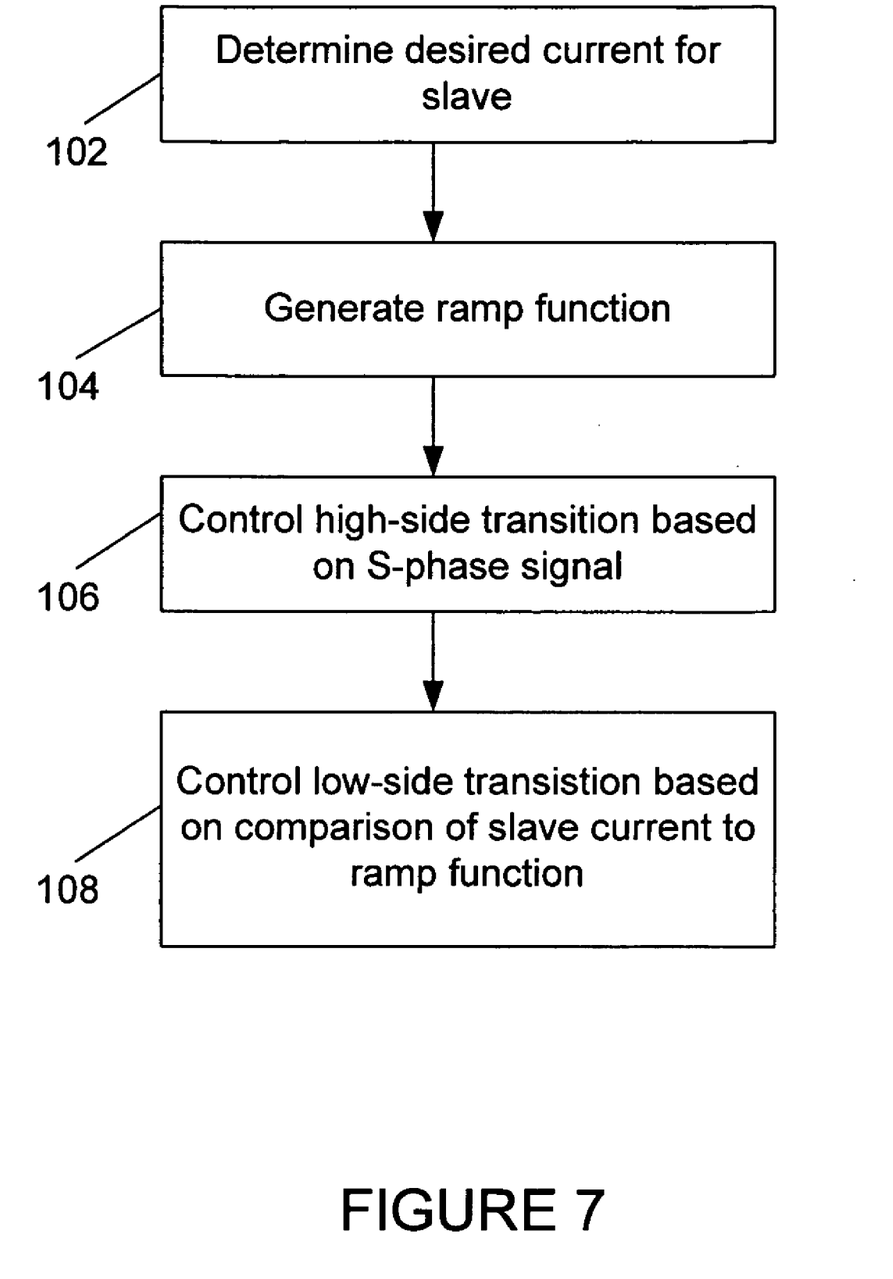
FIG. 7 is a flow chart showing an exemplary method performed by slaves of an exemplary switching regulator.

Referring to FIG. 7, the internal controller determines a desired current $I_{des}$ for the particular slave, e.g., by applying a gain to the differential analog signal I-desired 34 (step 102), generates a ramp current $I_{ramp}$ for the slave based on I-desired (step 104), controls the high-side transition of the first and second transistors 20 and 22 based on the S-phase signal (step 106) and controls the low-side transition of the first and second transistors 20 and 22 by a comparison of the slave current to the ramp function (step 108), e.g., when the estimated output current $I_{estimate}$ equals or exceeds the ramping function $I_{ramp}$. It should be realized that, as these steps can be performed by analog components, where appropriate they can be considered to be performed on a continuous and simultaneous basis.

The internal controller 26 can also includes a microcontroller 66 (see FIG. 4) that can perform a digital control algorithm at a clock frequency $f_{slave-clock}$. The clock frequency $f_{slave-clock}$ can be generated by multiplying the S-phase signal on line 34, e.g. by a factor of ten to fifty, e.g. by twenty-eight or thirty. The resulting clock frequency $f_{clock}$ can be between about 16 and 66 MHz, e.g., about 33 MHz. Alternatively, the clock signal $f_{slave-clock}$ may be generated by the same clock that runs the microprocessor, by other IC devices in the load, or by a clock on the master controller chip.

The offset $\Delta I_{offset}$ for the ramp function is selected such the resulting switching performance causes the average current from the slave to be about equal to the desired slave current $I_{des}$. However, the inductance L, the input voltage $V_{in}$, are not known exactly (in addition, the output voltage $V_{out}$ is not necessarily known in the internal controller 26) and can change over time or vary from circuit to circuit, causing the slope of the slave current to depart from the expected value. Thus, the offset $\Delta I_{offset}$ can depart from the value needed to cause the average current from the slave to be about equal to the desired slave current. However, it is possible to use current measurements in an algorithm to correct the offset $\Delta I_{offset}$.

Figure 8:
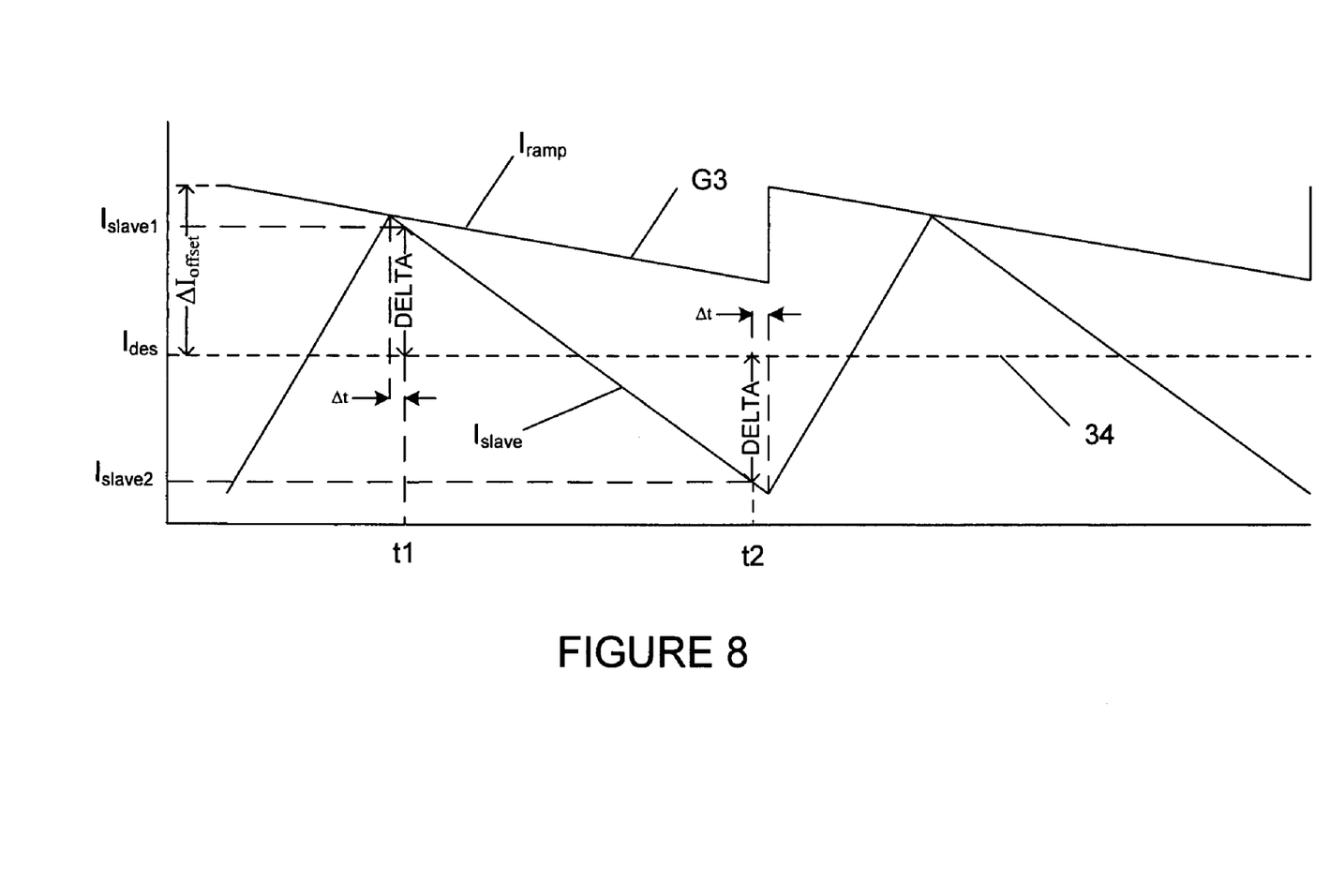
FIG. 8 is a timing diagram illustrating an exemplary ramping function, current passing through a slave, and timing of measurements to determine an offset of a ramping function from a desired current.

Referring to FIG. 8, in one implementation, each switching period T, the current $I_{slave}$ for the slave is checked twice. First, at a time t1, a fixed time $\Delta t$ after the beginning of the low-side conduction period, the actual current $I_{slave1}$ is compared to the desired current $I_{des}$ plus a current offset DELTA. Second, at a time t2 a fixed time $\Delta t$ before the beginning of the high-side conduction period, the actual current $I_{slave2}$ is compared to the desired current $I_{des}$ minus the current offset DELTA. Thus, 2×DELTA is about equal to the peak to valley difference of the estimated current.

In some implementations, the phase-locked loop 60 can generate an output signal having a higher frequency than the S-phase signal on line 32. The signal having a higher frequency is then used to configure the fixed time $\Delta t$, current offset DELTA, time t1 and time t2 to improve the efficiency (e.g., the switching period and phase difference of the slaves) of the switching regulator 10.

If the first current $I_{slave1}$ is greater than $I_{des}$+DELTA and the second current $I_{slave2}$ is greater than $I_{des}$−DELTA, then it is likely that the overall current is too high, and therefore the offset $\Delta I_{offset}$ can be reduced. If the first current $I_{slave1}$ is less than $I_{des}$+DELTA and the second current $I_{slave2}$ is less than $I_{des}$−DELTA, then it is likely that the overall current is too low, and therefore the offset $\Delta I_{offset}$ can be increased. If the first current $I_{slave1}$ is greater than $I_{des}$+DELTA but the second current $I_{slave2}$ is less than $I_{des}$−DELTA, then it is likely that the peak to peak current is larger than DELTA, and therefore DELTA can be increased. If the first current $I_{slave1}$ is less than $I_{des}$+DELTA but the second current $I_{slave2}$ is greater than $I_{des}$−DELTA, then it is likely that the peak to peak current is smaller than DELTA, and therefore DELTA can be decreased. This is summarized in the following table:

TABLE 2

| comparison at t1 | comparison at t2 | result |
| --- | --- | --- |
| $I_{slave1} > I_{des}$ + DELTA | $I_{slave2} > I_{des}$ − DELTA | decrease $\Delta I_{offset}$ |
| | $I_{slave2} < I_{des}$ − DELTA | increase DELTA |
| $I_{slave1} < I_{des}$ + DELTA | $I_{slave2} > I_{des}$ − DELTA | decrease DELTA |
| | $I_{slave2} < I_{des}$ − DELTA | increase $\Delta I_{offset}$ |

Once both DELTA and the ramp offset $\Delta I_{offset}$ have the proper values, the currents at t1 and t2 will be equidistant from the desired current $I_{des}$, and consequently average of the real current $I_{slave}$ will match the desired slave current $I_{des}$.

What is claimed is:

1. A voltage regulator having an input terminal coupled to an input voltage source and an output terminal coupled to a load, comprising:
   a master controller which receives a measurement of an output voltage at the output terminal and generates a switching signal having a frequency on a common line;
   a plurality of slaves, each slave connected to the common line to receive the switching signal, each slave including:
      a switching circuit to intermittently couple the input terminal to an intermediate terminal;
      phase shift circuitry to receive and phase shift the switching signal; and
      an internal controller that receives the phase shifted switching signal and is configured to control the switching circuit using the phase shifted switching signal; and
   a filter between the intermediate terminals and the output terminal to provide a generally DC output voltage at the output terminal.

2. The voltage regulator of claim 1, wherein each switching circuit is switchable between a first state in which the intermediate terminal is connected to an input terminal and a second state in which the intermediate terminal is connected to ground.

3. The voltage regulator of claim 2, wherein the internal controller is configured such that the phase shifted switching signal triggers the switching circuit to change from one of the first state or the second state to the other of the first state or the second state.

4. The voltage regulator of claim 3, wherein the internal controller is configured such that the phase shifted switching signal triggers the switching circuit to change from second state to the first state.

5. The voltage regulator of claim 1, wherein the master controller receives a measurement of an output voltage at the output terminal and generates a desired current signal, and each internal controller receives the desired current signal and is configured to control the switching circuit based on the desired current signal.

6. The voltage regulator of claim 1, wherein each phase shift circuitry comprises a phase locked loop.

7. The voltage regulator of claim 6, wherein the phase locked loop offsets the switching signal so that each slave is phase-offset relative to other slaves.

8. The voltage regulator of claim 1, wherein each internal controller is configured to set a phase shift of the phase shift circuitry.

9. The voltage regulator of claim 8, wherein each internal controller is configured to store a unique identification code for a corresponding slave, receive a message indicating a total number of slaves, and determine the phase shift for that slave based on the identification code and total number of slaves.

10. The voltage regulator of claim 9, wherein the internal controller is configured to determine the phase shift using a look up table.

11. The voltage regulator of claim 9, wherein the internal controller is configured to:
receive a message containing data indicating a coupling between inductors in the filter; and
determine the phase shift for a corresponding slave based on the identification code, the total number of slaves and the data.

12. The voltage regulator of claim 9, wherein the message contains a counter, and, each internal controller is configured to increment the counter, and a last internal controllers returns the incremented counter indicating the total number of slaves to the master controller.

13. The voltage regulator of claim 8, wherein the internal controller is configured such that different slaves have different phases.

14. The voltage regulator of claim 1, wherein the filter includes a plurality of parallel inductors, each inductor having an input end connected to the intermediate terminal of an associated slave and an output end connected to the output terminal.

15. The voltage regulator of claim 1, wherein each slave is fabricated on a different chip.

16. The voltage regulator of claim 15, wherein the master controller is fabricated on a different chip from the slaves.

17. The voltage regulator of claim 6, wherein the phase locked loop is configured to offset the switching signal by generating a signal having a higher frequency than the switching signal, and each slave is configured to phase-offset relative to other slaves based on the signal having the higher frequency.

18. A slave switching chip for a voltage regulator, comprising:
a switching circuit to intermittently couple an input terminal to an intermediate terminal;
phase shift circuitry to receive a switching signal and phase shift the switching signal based on a phase offset; and
an internal controller that receives the phase shifted switching signal and is configured to control the switching circuit using the phase shifted switching signal.

19. The slave switching chip of claim 18, wherein the switching circuit is switchable between a first state in which the intermediate node is connected to an input terminal and a second state in which the intermediate node is connected to ground.

20. The slave switching chip of claim 19, wherein the internal controller is configured such that the phase shifted switching signal triggers the switching circuit to change from one of the first state or the second state to the other of the first state or the second state.

21. The slave switching chip of claim 18, wherein the internal controller receives a desired current signal and is configured to control the switching circuit based on the desired current signal.

22. The slave switching chip of claim 18, further comprising a phase locked loop operable to generate the phase offset.

23. A method of operating a voltage regulator having an input terminal coupled to an input voltage source and an output terminal coupled to a load, the method comprising:
detecting an output voltage at the output terminal;
determining a desired total current for a plurality of slaves each of which having an intermediate terminal from the detected output voltage;
generating a differential analog signal representative of the desired total current;
deriving a desired slave current for each slave based on the differential analog signal;
phase shifting the differential analog signal received at each slave such that each slave has a different phase shift relative to other slaves; and
controlling a conduction state of each slave based on the phase-shifted differential analog signal to produce the desired slave current.

24. The method of claim 23, where controlling a conduction state includes selecting one of a first conduction state in which the intermediate terminal is coupled to the input terminal and a second conduction state in which the intermediate terminal is coupled to a ground.

25. The method of claim 24, further comprising:
detecting an output current of each slave at the intermediate terminal;
receiving a parameter;
deriving a ramp function for each slave based on the differential analog signal having a corresponding phase shift and the received parameter; and
if the output current of a slave equals or exceeds the ramp function, transitioning that slave from the first conduction state to the second conduction state.

26. The method of claim 24, further comprising:
determining an offset value such that an average output current of the slave at the intermediate terminal is substantially equal to the desired slave current; and
setting the ramp function substantially proportional to the slave desired current and the offset value.

* * * * *